(12) United States Patent
Rice et al.

(10) Patent No.: US 7,652,673 B1
(45) Date of Patent: Jan. 26, 2010

(54) TEXTURE MAPPING METHOD AND APPARATUS FOR COMPUTER IMPLEMENTED GRAPHICAL IMAGE PROCESSING

(75) Inventors: Daniel S. Rice, Oakland, CA (US); Yajyun Wang, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/309,480

(22) Filed: May 10, 1999

Related U.S. Application Data

(63) Continuation of application No. 08/563,157, filed on Nov. 27, 1995, now abandoned.

(51) Int. Cl.
*G09G 5/00* (2006.01)
*G09G 5/02* (2006.01)
(52) U.S. Cl. ...................................... 345/582; 345/589
(58) Field of Classification Search ......... 345/419–428, 345/581–588, 589
See application file for complete search history.

(56) References Cited

U.S. PATENT DOCUMENTS

| | | | |
|---|---|---|---|
| 5,204,944 A | 4/1993 | Wolberg et al. | 395/127 |
| 5,548,709 A | 8/1996 | Hannah et al. | 395/164 |

(Continued)

FOREIGN PATENT DOCUMENTS

EP 95/24682 9/1995

OTHER PUBLICATIONS

Neider et al., "Texture Mapping," OpenGL Programming Guide: the Official Guide to Learning OpenGL, Release 1, Aug. 1994, Chapter 9, pp. 266-277.

(Continued)

*Primary Examiner*—Ryan R Yang
(74) *Attorney, Agent, or Firm*—Meyertons, Hood, Kivlin, Kowert & Goetzel, P.C.

(57) ABSTRACT

Texture mapping includes (i) calculating the weighted average of the colors of two texels near a particular pixel, (ii) determining a fractional portion of a texture coordinate of the pixel, and (iii) retrieval of a pair of complementary coefficients from a table of pairs of predetermined, complementary coefficients according to the fractional portion of the coordinate of the pixel. Each of the complementary coefficients corresponds to the relative distance between the pixel and each of the two texels as represented by the fractional portion of the first coordinate of the pixel in the coordinate space of the texture image since each texel has whole, integer coordinates in the coordinate space of the texture image. Each coefficient of the pair of complementary coefficients is used to weight a respective one of the colors of the two texels and the weighted colors are summed to produce a weighted average color of the two texels. A weighted average of the colors of the other two of the four nearest texels is calculated in the same manner. The pair of complementary coefficients are partitioned values in a single data word and are therefore loaded into the processor which performs the calculate the weighted average only once to weight two separate colors. The precision and data format of each coefficient of the table are the same as the precision and data format of each component of each pixel of the rendered graphical image. Accordingly, the processing environment remains unchanged while a computer processor alternately interpolates a texel color and combines the interpolated texel color with the color of the pixel.

46 Claims, 10 Drawing Sheets

U.S. PATENT DOCUMENTS

| | | | |
|---|---|---|---|
| 5,594,846 A | | 1/1997 | Donovan .................... 345/582 |
| 5,886,706 A | * | 3/1999 | Alcorn et al. ............... 345/582 |
| 6,141,725 A | * | 10/2000 | Tucker et al. ............... 711/100 |
| 6,181,347 B1 | * | 1/2001 | Devic et al. ................ 345/586 |
| 6,184,894 B1 | * | 2/2001 | Rosman et al. ............. 345/582 |

OTHER PUBLICATIONS

Flume et al., "A Parallel Scan Conversion Algorithm with Anti-Aliasing for a General-Purpose Ultracomputer," Computer Graphics, vol. 17, No. 3, Jul. 1983.

* cited by examiner

TEXTURE MAPPING METHOD AND APPARATUS FOR COMPUTER IMPLEMENTED GRAPHICAL IMAGE PROCESSING

This application is a continuation of U.S. patent application Ser. No. 08/563,157, filed Nov. 27, 1995, now abandoned entitled "Texture Mapping Method and Apparatus for Computer Implemented Graphical Image Processing", now abandoned.

FIELD OF THE INVENTION

The present invention relates to graphical image processing in a computer system and, in particular, to a particularly efficient texture mapping mechanism.

BACKGROUND OF THE INVENTION

Texture mapping is a type of image processing and is used typically to give a three-dimensional or a two-dimensional object a particular surface appearance, e.g., the appearance of having a rough surface or of being composed of marble or granite or bricks. Texture mapping is well-known but is described briefly for completeness. Generally, a two-dimensional texture image, which typically specifies a textured pattern, is mapped to a surface of a graphical object. The result of rendering the graphical object on a computer display device after such texture mapping is the appearance that the textured pattern is on the surface of the rendered graphical object. For example, the texture image can be a two-dimensional image which is mottled grey which resembles the coloring and pattern of granite, and the object can be a three-dimensional chair. The result of mapping the granite texture image to the three-dimensional chair and rendering the chair is the display of the three-dimensional chair in a computer display device such that the chair appears to be made of granite. This appearance is achieved generally by combining with the color of each pixel of the graphical object the color of a corresponding texel of the texture image. Colors of corresponding texels and pixels can be combined in a number of ways, including various modulation, blending, replacing, and decal techniques.

Texture mapping typically requires substantial resources. Mapping a texture image to the surface of a graphical object typically involves misaligned pixels and texels. A pixel is an element of the picture, i.e., of the rendering in a computer display device, of a graphical object and has a single color. A texel is an element of a texture image and similarly has a single color. Mapping a texture image to a graphical object which is either not flat or not two-dimensional almost always results in misalignment of texels of the mapped texture image and pixels of the rendered image of the graphical object, i.e., results in texels and pixels which are not coincident in a common coordinate space. In addition, it is frequently desirable to scale a textured graphical object to a particular size and to scale the texture image accordingly. The scaling of a textured image can be used, for example, to represent distance from a viewer of the textured graphical object in a computer display device. Such scaling requires magnification or minification of the textured image to comport with the relative size of the graphical object, resulting in further misalignment of pixels and texels.

To combine the color of a pixel with the color of a texel in any of the ways listed above, coordinates of the pixel in the coordinate space of the texture image are determined and the color of the texel at those coordinates is retrieved from the texture image so that the colors can be combined. When a pixel is not aligned with any particular texel, the color of a texel corresponding to the pixel is generally derived from the texels nearest the pixel. In some conventional texture mappers, the color of the texel nearest the pixel is selected. However, mapping a texel to a pixel in this manner frequently results in undesirable effects in the rendering of the textured graphical object. It is usually preferred to interpolate a color between the colors of the texels nearest the pixel. Mapping an interpolated texel to the pixel and combining the color of the interpolated texel with the color of the pixel generally achieves a smooth, visually pleasing, desirable result.

In conventional texture mapping, the proximity of a pixel of the graphical object to each of the nearest four texels of the texture image is determined, and the weighted average of the colors of the four nearest texels is determined, based on the relative proximity of each of the texels to the pixels. The relative proximity of each of the texels to a particular pixel is calculated by (i) determining the distance between each of the texels and the pixel, (i) scaling the determined distances to produce respective weights for the texels, (iii) multiplying each component of the color of each texel by the respective weight of the texel, and (iv) summing the weighted components of the colors to form a weighted average color. Scaling each of the determined distances typically involves several arithmetic operations, requiring substantial computing resources.

For example, calculation of complementary weights for two texels near a pixel require two distance calculations (each typically involving at least a substraction operation), and a separate multiplication operation for each distance calculation. These operations are required for deriving a weighted average of only two texels in a single dimension. Typically, a weighted average of four texels in two dimensions is combined with the pixel. The most efficient of conventional texture mapping mechanisms repeats the above operations to form a weighted average of the remaining two texels and then repeats the above operations again to form an interpolated texel color which is a weighted average of the two previously calculated weighted averages. These operations represent a substantial component of the resources required to map a texture image to a graphical object.

Because of the substantial resources required in texture mapping a graphical image, a need for ever increasingly efficient texture mapping systems persists in the industry.

SUMMARY OF THE INVENTION

In accordance with the present invention, pixels of a graphical object are mapped to a coordinate space of a texture image and a weighted average color of the four nearest texels of the texture image is blended with the color of each pixel to give a rendering of the graphical object a textured appearance of the texture image. To calculate the weighted average of the colors of two texels near a particular pixel, a fractional portion of a texture coordinate, e.g., the horizontal texture coordinate, of the pixel is determined and a pair of complementary coefficients is retrieved from a table of pairs of predetermined, complementary coefficients according to the fractional portion of the coordinate of the pixel. Each of the complementary coefficients corresponds to the relative distance between the pixel and each of the two texels as represented by the fractional portion of the first coordinate of the pixel in the coordinate space of the texture image since each texel has whole, integer coordinates in the coordinate space of the texture image. Each coefficient of the pair of complementary coefficients is used to weight a respective one of the colors of the two texels and the weighted colors are summed to produce a weighted average color of the two texels. A weighted average of the colors of the other two of the four nearest texels is calculated in the same manner.

Since a pair of complementary coefficients are retrieved from a table according to the fractional portion of the texel coordinate of the pixel, distance calculations between texels and the pixel, and multiplication operations to weight the distances, are obviated. Instead, a single value, i.e., the fractional portion of the texel coordinate of the pixel, is calculated and two (2) appropriately weighted, complementary coefficients are retrieved in a single read operation. Therefore, the resources required to determine the relative weights of the nearest texels is substantially reduced.

To calculate the weighted average of the colors of all four nearest texels, a fractional portion of a second coordinate, e.g., the vertical coordinate, of the pixel is determined and a second pair of complementary coefficients is retrieved from the same table according to the fractional portion of the second coordinate. Each of the pair of complementary coefficients is used to weight a respective one of the weighted average colors and the two weighted average colors are then summed to produce an interpolated texel color which is a weighted average of the colors of the four texels nearest the pixel.

The pair of complementary coefficients are partitioned values in a single data word and are therefore loaded into the processor which performs the calculate the weighted average only once to weight two separate colors. As a result, for each pixel rendered, one load instruction to load the second of two separate coefficients is obviated.

In one embodiment of the present invention, the precision and data format of each coefficient of the table are the same as the precision and data format of each component of each pixel of the rendered graphical image. Accordingly, the processing environment remains unchanged while a computer processor alternately interpolates a texel color and combines the interpolated texel color with the color of the pixel. For example, in a processor in which a scale factor defines the precision and data format of operands of operations performed in the interpolation of the color of a texel and the combination of the interpolated texel color with the color of the pixel, a single scale factor defines the precision and data format of both the coefficients stored in the table and the components of the color of the pixel. As a result, changing of the operational environment, which typically involves at least a store instruction, during interpolation of colors of texels and combination of the interpolated colors of texels with the color of the pixel is obviated, thereby further increasing the efficiency with which a texture graphical image is rendered.

DETAILED DESCRIPTION

Figure 1:
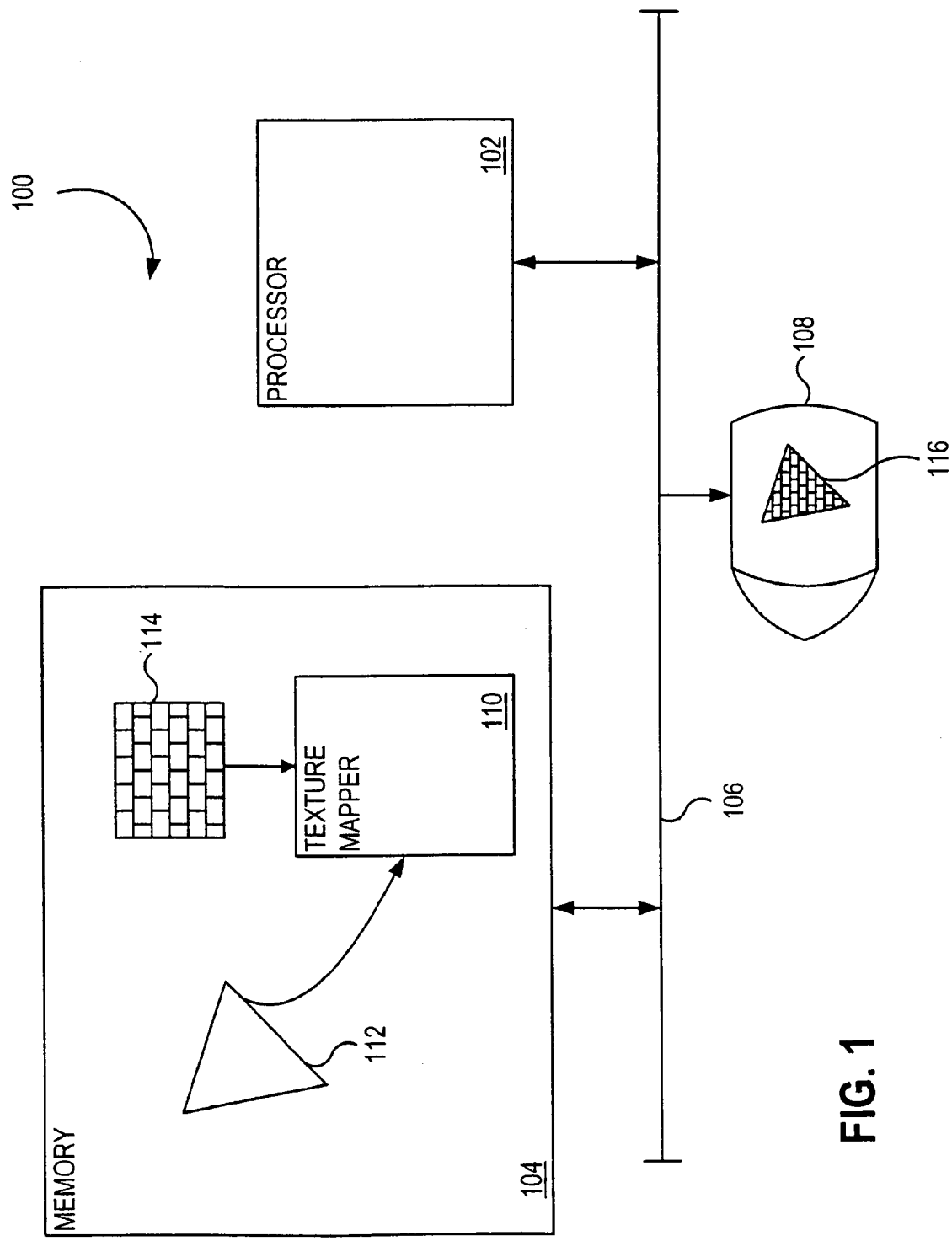
FIG. 1 is a block diagram of a computer system which includes a processor and a texture mapper in accordance with the present invention.

In accordance with the present invention, relative weights of texels nearest a particular pixel are determined by a table lookup of predetermined weights according to an integer which represents a fractional portion of a texel address. A partitioned coefficient, which represents the relative weights of two texels, is retrieved from the weight table and used in a partitioned multiplication operation in a processor to weight each of four components of the color of a particular texel simultaneously and in parallel. The four components of the color can be, for example, alpha, blue, green, and red. By using a partitioned coefficient, the coefficient is loaded into the processor once for two consecutive partitioned multiplication operations obviating reloading the partitioned coefficient into the processor.

Furthermore, the partitioned coefficient is scaled such that a scale factor, which is loaded into the processor for a separate and independent calculation, can be left in the processor unchanged during calculations of the weighted average of the nearest texels. As a result, significant processing involved in swapping different scale factors into and out of the processor is avoided.

Hardware Components of the Texture Mapping System

To facilitate appreciation of the present invention, the hardware components of the texture mapping system are briefly described. Computer system 100 (FIG. 1) includes a processor 102 and memory 104 which is coupled to processor 102 through a bus 106. Processor 102 fetches from memory 104 computer instructions and executes the fetched computer instructions. Processor 102 also reads data from and writes data to memory 104 and sends data and control signals through bus 106 to a computer display device 108 in accordance with fetched and executed computer instructions. Processor 102 is described in greater detail below.

Memory 104 can include any type of computer memory and can include, without limitation, randomly accessible memory (RAM), read-only memory (ROM), and storage devices which include storage media such as magnetic and/or optical disks. Memory 104 includes a texture mapper 110, which is a computer process executing within processor 102 from memory 104. A computer process is a collection of computer instructions and data which collectively define a task performed by computer system 100. As described more completely below, texture mapper 110 (i) reads from a graphical object 112 and a texture image 114, both of which are stored in memory 104, (i) creates from graphical object 112 and texture image 114 a textured graphical object 116, and (iii) causes textured graphical object 116 to be displayed in computer display device 108.

Computer display device 108 can be any type of computer display device including without limitation a cathode ray tube (CRT), a light-emitting diode (LED) display, or a liquid crystal display (LCD). Computer display device 108 receives from processor 102 control signals and data and, in response to such control signals, displays the received data. Computer display device 108, and the control thereof by processor 102, is conventional.

Figure 2:
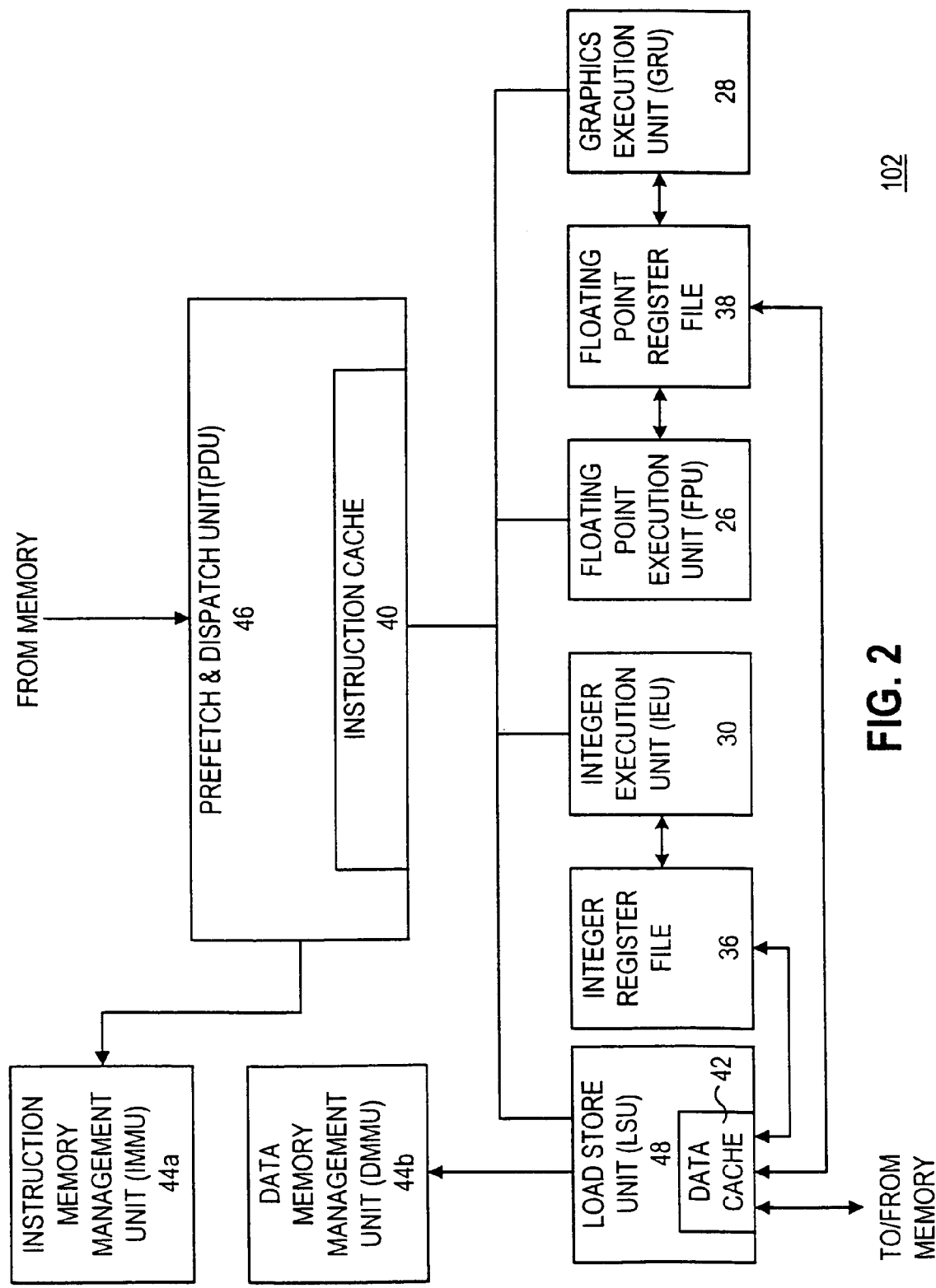
FIG. 2 is a block diagram showing the processor of FIG. 1 in greater detail.

Processor 102 is shown in greater detail in FIG. 2 and is described briefly herein and more completely in U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) which is incorporated in its entirety herein by reference. Processor 102 includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown. Additionally, processor 102 includes two memory management units (IMMU & DMMU) 44a-44b, and a load and store unit (LSU) 48, which in turn includes data cache 120, coupled to each other and the previously described elements as shown. Together, the components of processor 102 fetch, dispatch, execute, and save execution results of computer instructions, e.g., computer instructions of texture mapper 110 (FIG. 1), in a pipelined manner.

PDU 46 (FIG. 2) fetches instructions from memory 104 (FIG. 1) and dispatches the instructions to IEU 30 (FIG. 2), FPU 26, GRU 28, and LSU 48 accordingly. Prefetched instructions are stored in instruction cache 40. IEU 30, FPU 26, and GRU 28 perform integer, floating point, and graphics operations, respectively. In general, the integer operands and results are stored in integer register file 36, whereas the floating point and graphics operands and results are stored in floating point register file 38. Additionally, IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a-44b map virtual addresses to physical addresses.

PDU 46, IEU 30, FPU 26, integer and floating point register files 36 and 38, MMUs 44a-44b, and LSU 48 can be coupled to one another in any of a number of configurations as described more completely in the '572 application. As described more completely in the '572 application with respect to FIGS. 8a-8d thereof, GRU 28 performs a number of distinct partitioned multiplication operations and partitioned addition operations. Various partitioned operations used by texture mapper 110 (FIG. 1) are described more completely below.

As described above, processor 102 includes four (4) separate processing units, i.e., LSU 48, IEU 30, FPU 26, and GRU 28. Each of these processing units is described more completely in the '572 application. These processing units operate in parallel and can each execute a respective computer instruction while others of the processing units executes a different computer instruction. GRU 28 executes the partitioned multiplication and partitioned addition operations described below. As described in the '572 application, GRU 28 has two separate execution paths and can execute two instructions simultaneously. GRU 28 can execute a partitioned addition operation while simultaneously executing a partitioned multiplication operation.

In one embodiment, processor 102 is the UltraSPARC processor available from SPARC International, Inc., and computer system 100 (FIG. 1) is the UltraSPARCstation available from Sun Microsystems, Inc. of Mountain View, Calif. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Texture Mapping

In creating textured graphical object 116 (FIG. 1), texture mapper 110 (i) maps pixels of graphical object 112 to the coordinate space of texture image 114 to determine a texel color corresponding to each pixel and (ii), using one of a number of techniques, combines the texel colors with the color of each of the pixels of graphical object 112 to form a corresponding pixel of textured graphical object 116. The result of the combination of colors from texels of texture image 114 with colors of corresponding pixels of graphical object 112 is textured graphical object 116 which can be, for example, of the general color and three-dimensional shading of graphical object 112 but has a textured appearance as defined by texture image 114. For example, if graphical object 112 is a green triangle and texture image 114 is a brick pattern, textured graphical object 116 appears to be made of green bricks.

Figure 3:
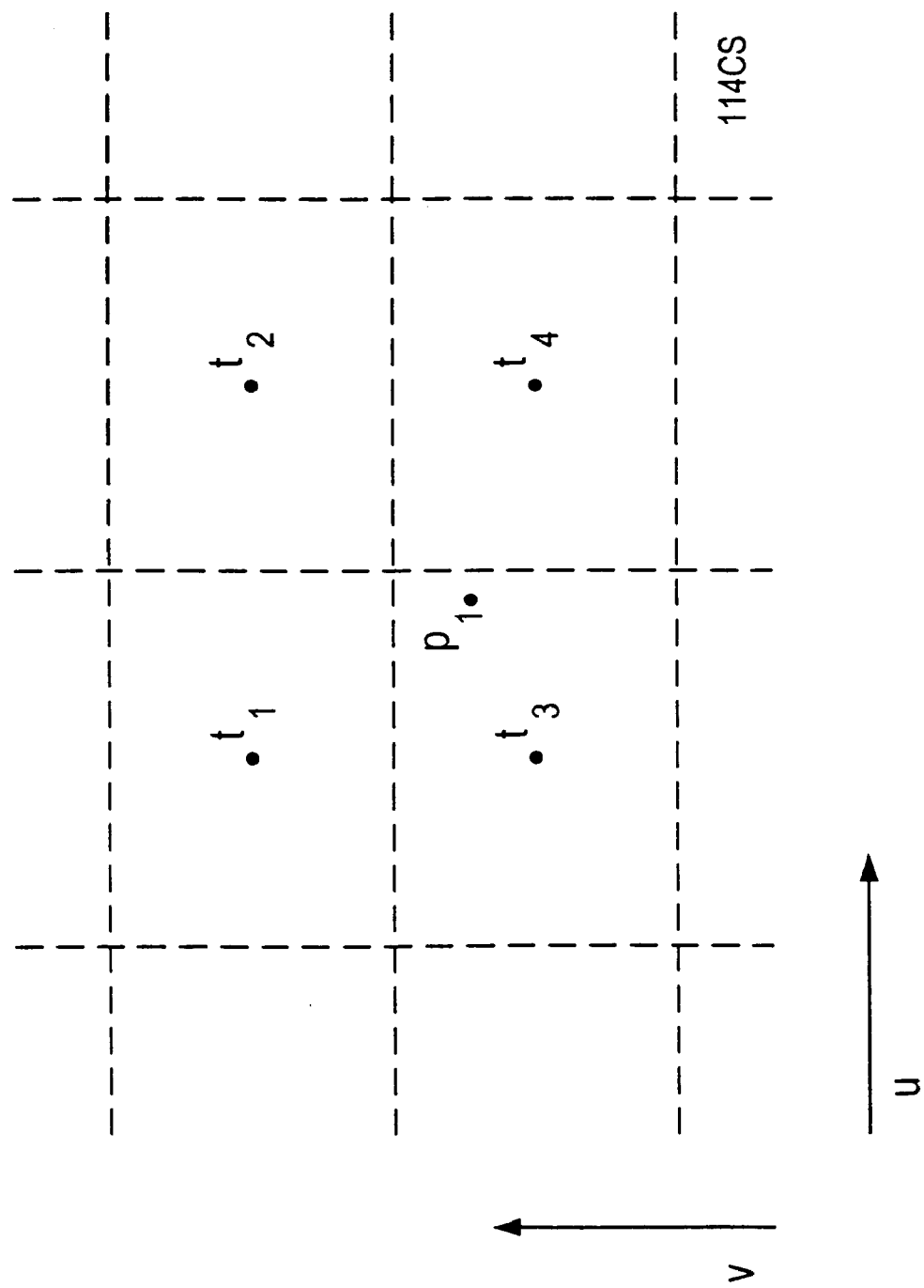
FIG. 3 shows a pixel in a texel coordinate space.

FIG. 3 shows a pixel $p_1$ of graphical object 112 (FIG. 1) which is mapped by texture mapper 110 to a coordinate space 114CS (FIG. 3) in which texture image 114 (FIG. 1) is defined. As shown in FIG. 3, pixel $p_1$ is nearest texels $t_1, t_2, t_3$, and $t_4$ of texture image 114 (FIG. 1). Accordingly, texture mapper 110 blends the color of pixel $p_1$ (FIG. 3) with a texel color interpolated from texels $t_1, t_2, t_3$, and $t_4$. The interpolated texel color can be, e.g., a weighted average in which the weight attributed to each of texels $t_1, t_2, t_3$, and $t_4$ corresponds to the distance between each of texels $t_1, t_2, t_3$, and $t_4$ and pixel $p_1$.

In conventional texture mappers, a weighted average color is calculated using floating point arithmetic operations at a significant cost in terms of processing resources and time. However, in accordance with the present invention, a weighted average color is determined using scaled weights which are represented by pairs of predetermined, complementary coefficients and which are retrieved from a weight table 402 (FIG. 4), which is included in texture mapper 110.

In general, graphical object 112 (FIG. 1) is specified by a number of points each of which is defined in a coordinate space and has a corresponding color. In general, the coordinate space of the points of graphical object 112 include coordinates x, y, z, u, and v, in which (x, y, z) specifies a location in three-dimensional space and (u, v) specify a location in the coordinate space of texture image 114. In rendering graphical object 112 to form textured graphical object 116 in computer display device 108, texture mapper 110 interpolates individual pixels and corresponding colors from the points which collectively specify graphical object 112. In interpolating a particular pixel from a number of points of graphical image 116, texture mapper 110 interpolates texture coordinates of pixel $p_1$ in coordinate space 114CS of texture image 114, i.e., in the form of $(u_p, v_p)$. Texture mapper 110 stores the texture coordinates of pixel $p_1$ in records ipxu and ipxv, each of which stores a 32-bit signed number. Record ipxu stores the u coordinate of pixel $p_1$, and record ipxv stores the v coordinate of pixel $p_1$. Records ipxu and ipxv are directly analogous to one another and the following description of record ipxu is equally applicable to record ipxv.

Figure 4:
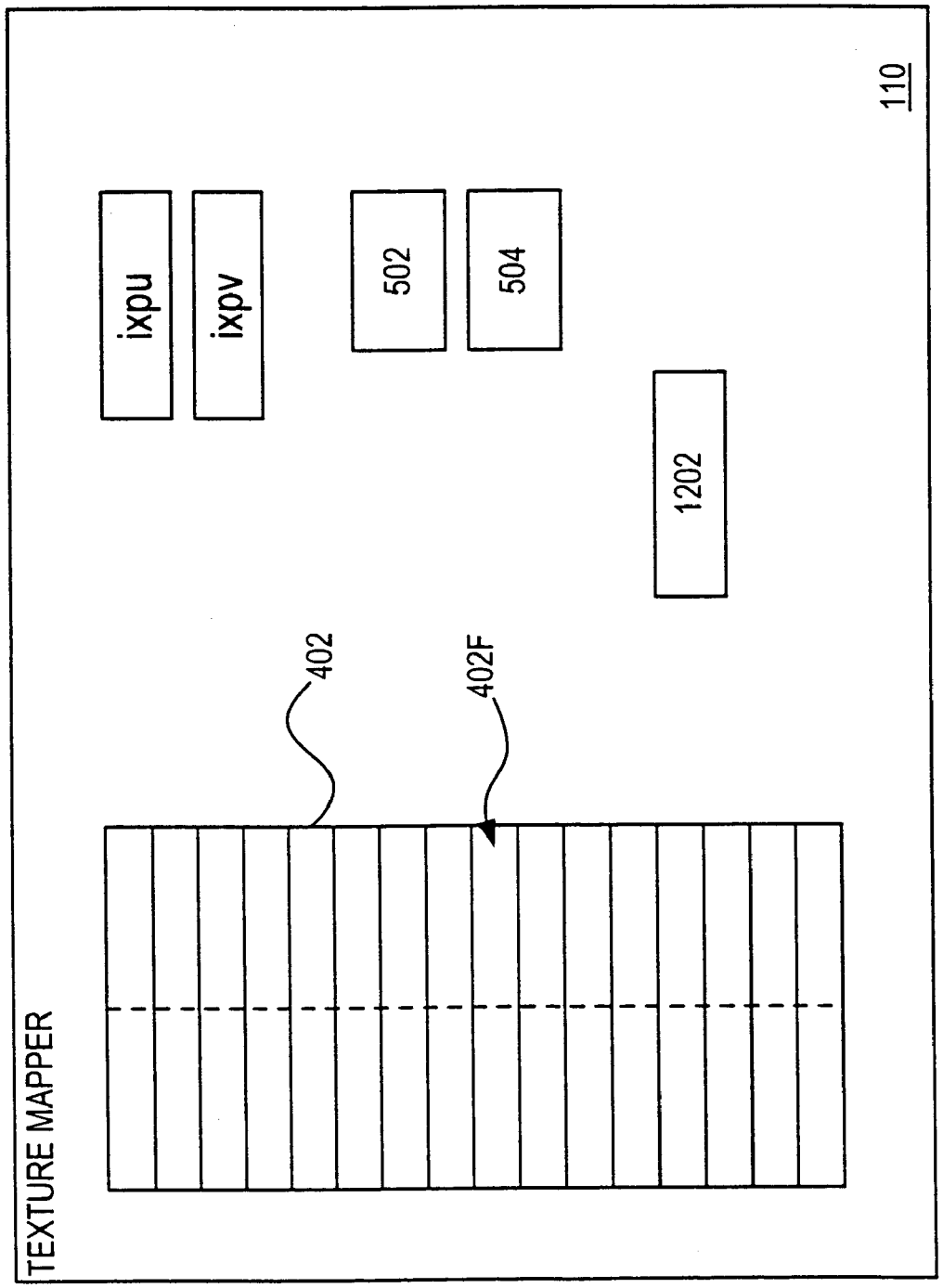
FIG. 4 is a block diagram of the texture mapper of FIG. 1 in greater detail.
Figure 5:
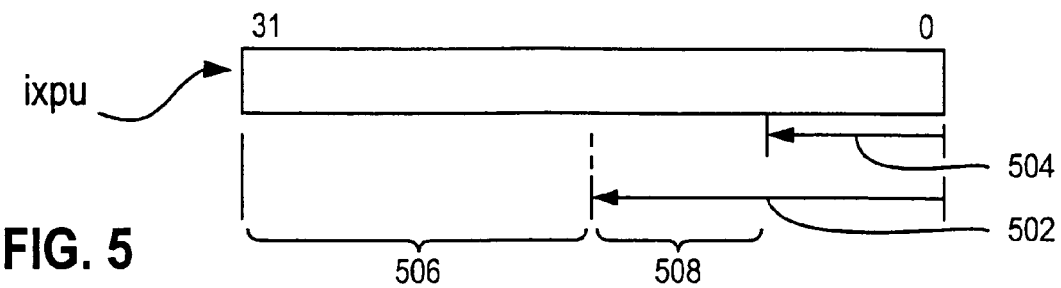
FIG. 5 is a block diagram of a record of a texture coordinate of a pixel.

Record ipxu is shown in greater detail in FIG. 5. Record ipxu stores an integer value in which an implicit decimal point separates a whole, integer portion 506 and a fractional portion 508. Thus, processor 102 can use integer operations to process data which represent numbers with fractional components. The value stored in record ipxu is scaled such that (i) a value of n−1, where n is the number of texels in the dimension of the u coordinate of texture image 114, is stored in record ipxu if pixel $p_1$ has a u coordinate which is equal to the maximum value of u defined for texture image 114 in coordinate space 114CS and (ii) a value of 0 is stored in record ipxu if pixel $p_1$ has a u coordinate which is equal to the minimum value of u defined for texture image 114 in coordinate space 114CS. Record ipxu includes whole portion 506 and fractional portion 508, which are defined by records 502 (FIG. 4) and 504 of texture mapper 110. Specifically, record 502 stores data having an integer value which represents the position within record ipxu of the least significant bit of whole portion 506, and record 504 stores data having an integer value which represents the position within record ipxu of the least significant bit of fractional portion 508. In one embodiment, fractional portion 508 includes four bits of record ipxu, and therefore represents fractions in units of sixteenths, and whole portion 506 includes at most 28 bits of record ipxu.

Texture mapper 110 parses whole portion 506 and fractional portion 508 using, for example, bitwise shifting and masking operations. Whole portion 506 specifies the u coordinate of texels $t_1$ and $t_3$. The u coordinate of texels $t_2$ and $t_4$ is determined by incrementing the u coordinate of texels $t_1$ and $t_3$, respectively. Whole portion 506 can specify a u coordinate outside the range of u coordinates represented by texture image 114, e.g., outside the range 0 to n−1. A texel can be mapped to such a u coordinate in any of a number of ways. For example, (i) a specific, background color can be assigned to any texel whose u coordinate is less than 0 or greater than n−1, (ii) the color of the nearest texel can be selected such that the color of the texel whose u coordinate is 0 is used for all pixels whose u coordinate is less than 0 and the color of the texel whose u coordinate is n−1 is used for all pixels whose u coordinate is greater than or equal to n, or (iii) the color of the texel whose u coordinate is the u coordinate of pixel $p_1$ modulo n such that the texture pattern specified by texture image 114 is, in effect, repeated to cover the entire surface of graphical object 112.

Fractional portion 508 represents a fractional portion of the u coordinate of pixel $p_1$ and therefore specifies the relative weights of texels $t_1$ and $t_2$ and of texels $t_3$ and $t_4$. Rather than calculating relative weights of texels $t_1$-$t_4$ using floating point arithmetic operation, texture mapper 110 uses fractional portion 508 to retrieve a partitioned coefficient from a weight table 402. Each item of weight table 402 is partitioned into two 16-bit fixed point numbers representing the relative weight of a particular texel. In one embodiment, weight table 402 has sixteen items and fractional portion 508 has four bits which collectively specify one of the sixteen items of weight table 402. Table A below represents an illustrative example of the items of weight table 402.

TABLE A

| Fractional Portion 508 | Upper Weight (in hexadecimal) | Lower Weight (in hexadecimal) |
| --- | --- | --- |
| 0 | 4000 | 0000 |
| 1 | 3C00 | 0400 |
| 2 | 3800 | 0800 |
| 3 | 3400 | 0C00 |
| 4 | 3000 | 1000 |
| 5 | 2C00 | 1400 |
| 6 | 2800 | 1800 |

TABLE A-continued

| Fractional Portion 508 | Upper Weight (in hexadecimal) | Lower Weight (in hexadecimal) |
| --- | --- | --- |
| 7 | 2400 | 1C00 |
| 8 | 2000 | 2000 |
| 9 | 1C00 | 2400 |
| 10 | 1800 | 2800 |
| 11 | 1400 | 2C00 |
| 12 | 1000 | 3000 |
| 13 | 0C00 | 3400 |
| 14 | 0800 | 3800 |
| 15 | 0400 | 3C00 |

The partitioned coefficients of weight table 402 are selected such that the partitioned coefficients are substantially evenly distributed over the range of values of fractional portion 508 and such that the sum of the partitioned coefficients of each of the items of weight table 402 are substantially equal to the maximum weight of a color component. In one embodiment, a component of a color is represented by an eight-bit unsigned integer whose value can range from 0 to 255. In this embodiment, the sum of each pair of partitioned coefficients is therefore equal to 256.0.

Specific coefficients in Table A above are represented as hexadecimal numbers. Each of the coefficients specified in Table A have implicit decimal points which separate whole, integer portions and fractional portions. The particular number of bits in each of the whole and fractional portions is selected to match the particular data format of colors of pixels which are interpolated by texture mapper 110 from points of graphical object 112. As described more completely below, the particular format selected in one embodiment is one in which the ten (10) most significant bits define a whole, integer portion of a particular coefficient and the six (6) least significant bits define a fractional portion of the coefficient. In this embodiment which is represented in Table A, the sum of the partitioned coefficients of each item is approximately 4000 in hexadecimal, which represents the value 256.0.

Texture mapper 110 (FIG. 4) retrieves from weight table 402 an item 402F corresponding to fractional portion 508 and uses the partitioned coefficients of item 402F to interpolate from the colors of texels $t_1$, $t_2$, $t_3$, and $t_4$ (FIG. 3) a composite weighted average color of a texel corresponding to pixel $p_1$.

Figure 6:
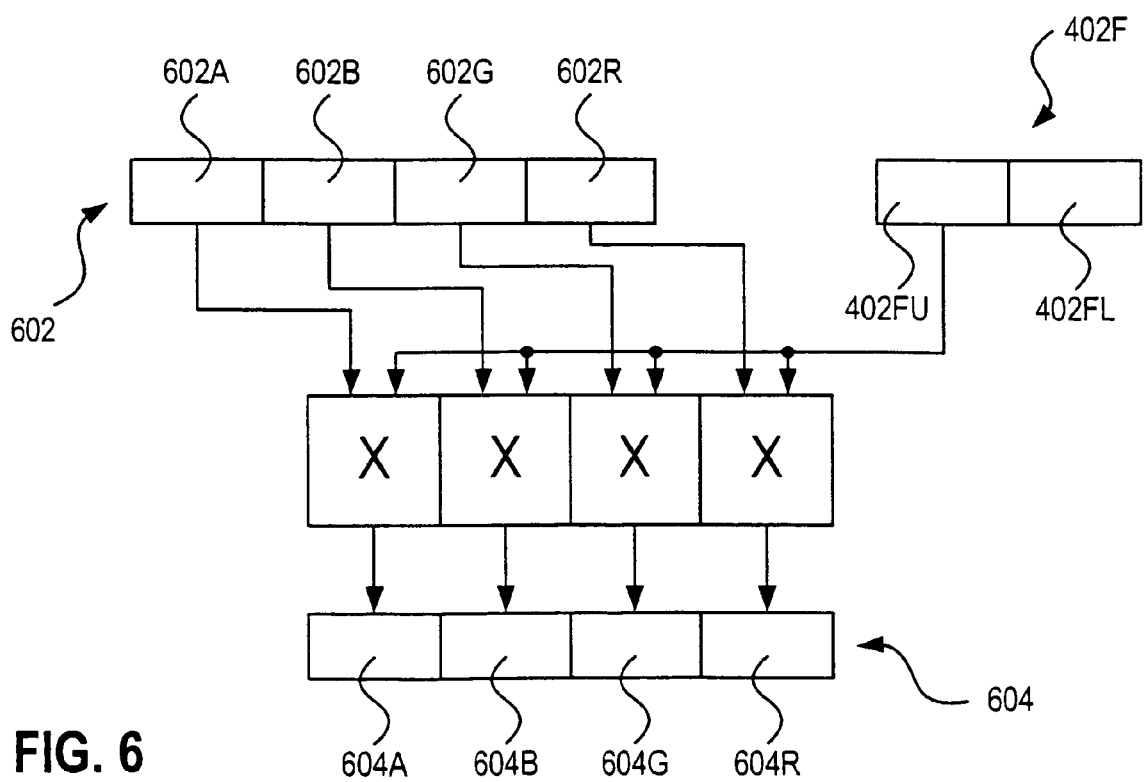
FIGS. 6 and 7 are each a block diagram illustrating a partitioned multiplication operation performed by the processor of FIG. 2.

Processor 102 (FIG. 1) can perform a number of partitioned operations, including MUL8X16, MUL8X16AL, MUL8X16AU, FPADD16, and FPACK16 operations. Texture mapper 110 multiplies each component of a color 602 (FIG. 6) corresponding to texel $t_1$ by the upper partitioned coefficient 402FU of item 402F by performance of the MUL8X16AU operation. Prior to performance of the MUL8X16AU operation, texture mapper 110 loads item 402F and color 602 into registers in floating point register file 38 (FIG. 2) of processor 102. Color 602 has four components 602A, 602B, 602G, and 602R which correspond to alpha, blue, green, and red components, respectively, of a color. Each of components 602A, 602B, 602G, and 602R are eight-bit unsigned integers. Texture mapper 110 causes processor 102 to perform the MUL8X16AU operation to thereby multiply each of components 602A, 602B, 602G, and 602R by upper coefficient 402FU simultaneously and in parallel to produce a weighted color 604 having components 604A, 604B, 604G, and 604R. Weighted color 604 is a 64-bit word and each of components 604A, 604B, 604G, and 604R is a sixteen-bit fixed point number.

Figure 7:
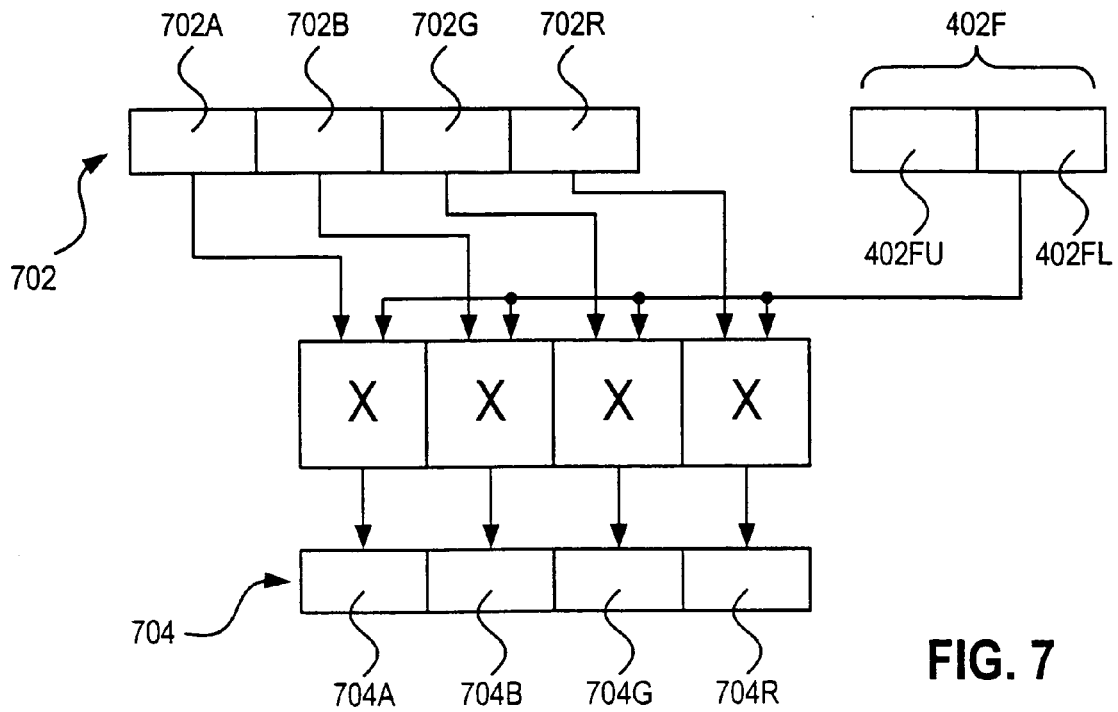
Figure 8:
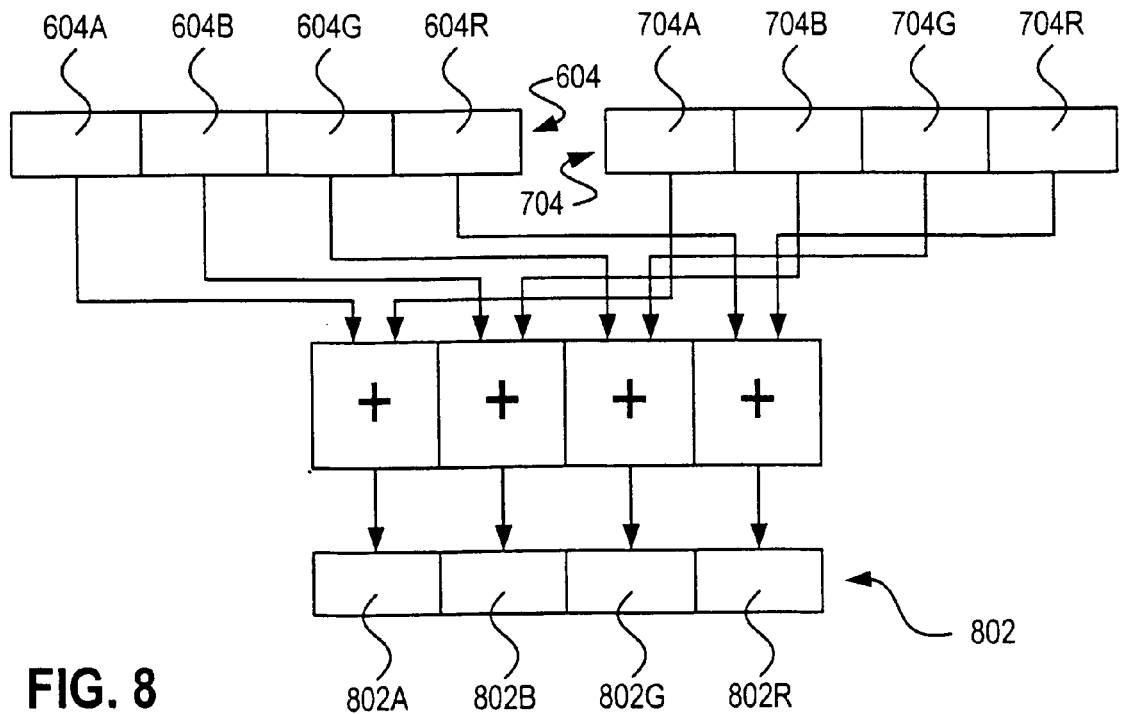
FIG. 8 is a block diagram illustrating a partitioned addition operation performed by the processor of FIG. 2.

Texture mapper 110 multiplies each component of a color 702 (FIG. 7) corresponding to texel $t_2$ by the lower coefficient 402FL of item 402F by causing processor 102 to perform the MUS8X16AL operation. Prior to performance of the MUL8X16AL operation, texture mapper 110 loads color 702 into a register in floating point register file 38 (FIG. 2). Since item 402F is already loaded into a register in floating point register file 38 (FIG. 2) for performance of the MUL8X16AU operation as described above, texture mapper 110 does not re-load item 402F, thereby further improving the efficiency with which a texel is mapped to a particular pixel. Color 702 has four components 702A, 702B, 702G, and 702R which correspond to alpha, blue, green, and red components, respectively, of a color. Each of components 702A, 702B, 702G, and 702R is an eight-bit unsigned integer. Texture mapper 110 uses the MUL8X16AL operation to cause processor 102 to multiply each of components 702A, 702B, 702G, and 702R by lower sixteen-bit fixed point number 402FL simultaneously and in parallel to produce a weighted color 704 having components 704A, 704B, 704G, and 704R. Weighted color 704 is a 64-bit word and each of components 704A, 704B, 704G, and 704R is a partitioned sixteen-bit fixed point number.

Texture mapper 110 uses the FPADD16 operation to add respective partitioned components of colors 604 and 704 to produce a weighted average color 802. In particular, performance of the FPADD16 operation by processor 102 (FIG. 1) in accordance with computer instructions fetched from texture mapper 110 adds components 604A, 604B, 604G, and 604R to components 704A, 704B, 704G, and 704R, respectively, simultaneously and in parallel to produce respective components 802A, 802B, 802G, and 802R of weighted average color 802. Weighted average color 802 is a 64-bit word and each of components 802A, 802B, 802G, and 802R is a partitioned sixteen-bit fixed point number.

As described above, colors 602 (FIG. 6) and 702 (FIG. 7) include four components, each of which is a partitioned eight-bit unsigned integer, and weighted average color 802 includes four components, each of which is a partitioned sixteen-bit fixed point number. Texture mapper 110 (FIG. 1) converts weighted average color 802 to the format of a color used by texture mapper 110, i.e., a 32-bit word which includes four partitioned eight-bit unsigned integers using the FPACK16 operation. The FPACK16 operation scales, clips, and packs each of four partitioned sixteen-bit fixed point numbers into a respective partitioned eight-bit unsigned integer and is represented diagrammatically in FIGS. 9A and 9B.

Figure 9A:
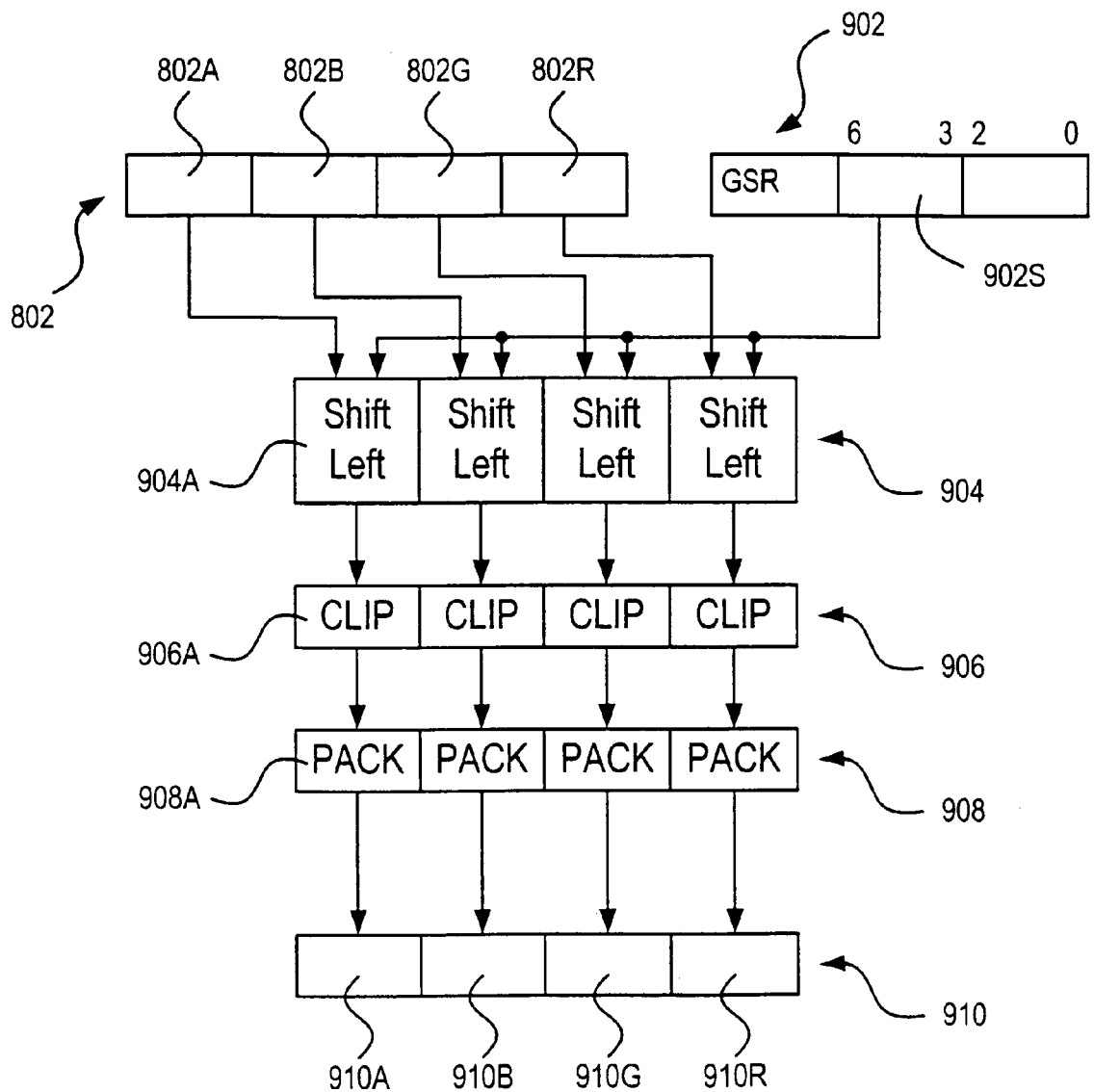
FIGS. 9A and 9B are block diagrams illustrating a partitioned packing operation performed by the processor of FIG. 2.
Figure 9B:
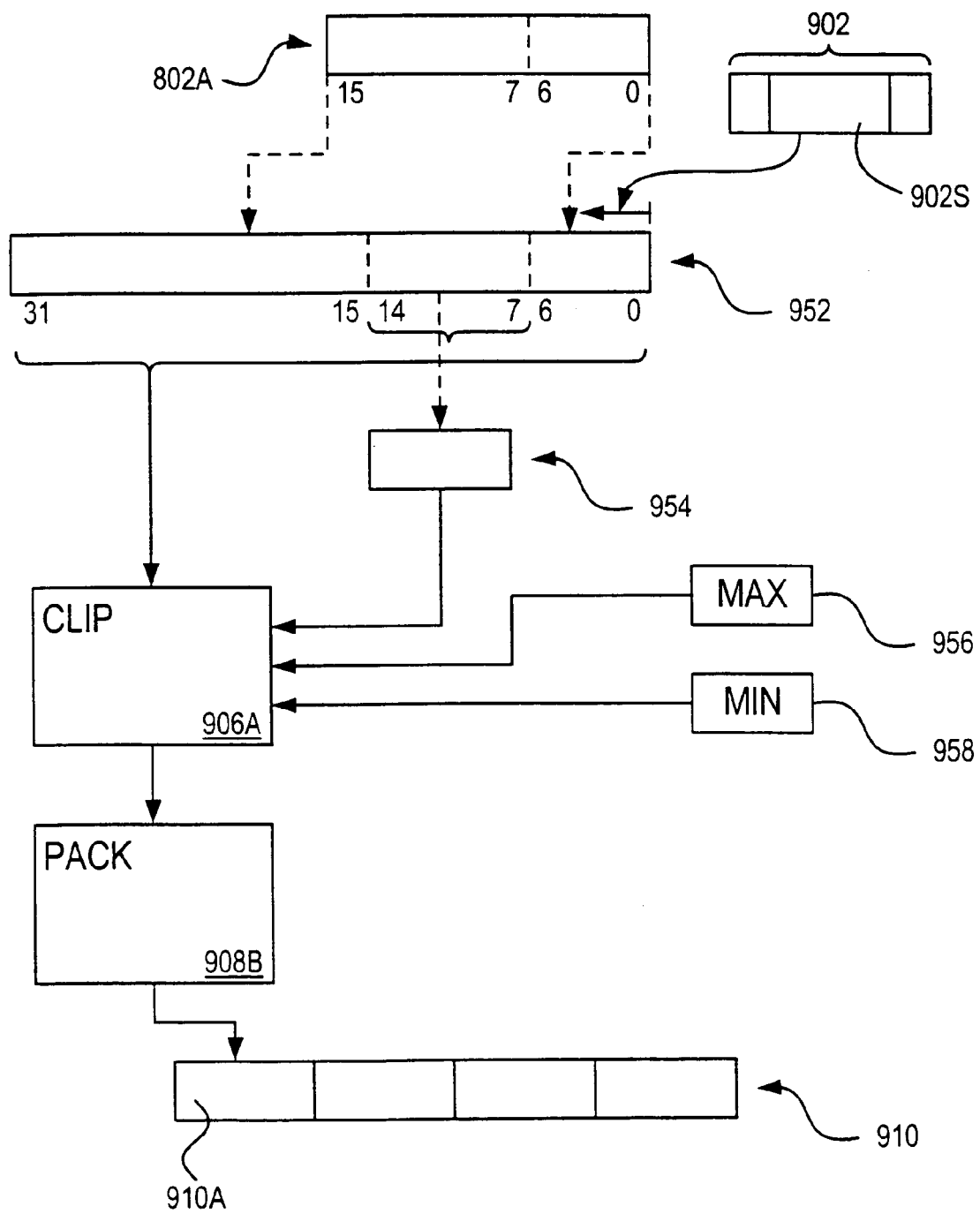

Floating point register file 38 (FIG. 2) includes a graphics status register (GSR) 902 FIG. 9A) which in turn includes a scale factor 902S. As represented by logic block 904, each of components 802A, 802B, 802G, and 802R is bit-shifted to the left by the number of bits specified in scale factor 902S of GSR 902. For example, bit-shifting component 802A (FIG. 9B) results in intermediate word 952. The seven least significant bits of intermediate word 952 represent a fractional portion of intermediate word 952 and the remaining most significant bits of intermediate word 952 represent the whole, integer portion of intermediate word 952. By providing a particular value for scale factor 902S, the implicit decimal point of component 802A is, in effect, shifted to the right a distance specified by scale factor 902S from a default position. For example, the default position shown in FIG. 9A immediately precedes the six least significant bits. In one embodiment, scale factor 902S stores data having a value of one, and component 802A therefore has an implicit decimal point immediately preceding the five least significant bits.

As represented by logic block 906, each of components 802A, 802B, 802G, and 802R, as bit-shifted, is clipped to produce a value between a maximum value, e.g., 255, and a minimum value, e.g., 1. For example, with respect to processing component 802A, a clip module 906A of logic block 906 compares the value of intermediate word 952 (FIG. 9B) to a maximum value stored in a maximum record 956 and to a minimum value stored in a minimum record 958. Clip module 906A provides to a pack module 908A (i) the maximum value if the value of intermediate record 952 is greater than the maximum value stored in maximum record 956, (ii) the minimum value if the value of intermediate record 952 is less than the minimum value stored in minimum record 958, or (iii) the least significant eight bits of the whole, integer portion of intermediate record 952 if the value of the intermediate record 952 is between the maximum and minimum values.

As represented by logic block 908 (FIG. 9A), each of components 802A, 802B, 802G, and 802R, as bit-shifted and clipped, is packed into a respective partitioned eight-bit component of weighted average color 910. Weighted average color 910 includes components 910A, 910B, 910G, and 910R, each of which is a partitioned eight-bit unsigned integer which is the preferred format of a color as used by texture mapper 110 as described above. Weighted average color 910 is a weighted average of colors 602 and 702 of texels $t_1$ and $t_2$, respectively.

Texture mapper 110 repeats the process described above with respect to FIGS. 6, 7, 8, 9A, and 9B to produce a weighted average color from colors corresponding to texels $t_3$ and $t_4$. Texels $t_3$ and $t_4$ are aligned vertically with texels $t_1$ and $t_2$, respectively, whose relative weights are specified by respective partitioned coefficients of item 402F, which corresponds to the fractional portion 508 of the u coordinate of pixel $p_1$. Accordingly, texture mapper 110 uses the partitioned coefficients of item 402F to produce the weighted average color corresponding to texels $t_3$ and $t_4$.

In a manner which is directly analogous to the weighted averaging of colors of texels $t_1$ and $t_2$ and of colors of texels $t_3$ and $t_4$ as described above, texture mapper 110 produces a interpolated texel color which is a weighted average of weighted average color 910 (FIG. 9A) and the weighted average color corresponding to texels $t_3$ and $t_4$. Specifically, texture mapper 110 (FIG. 4) stores in record ipxv data which represent the v coordinate of pixel $p_1$ in coordinate space 114CS (FIG. 3) of texture image 114. Texture mapper 110 (FIG. 4) parses the data stored in record ipxv in the manner described above to produce a whole, integer portion and a fractional portion of record ipxv. The whole, integer portion of record ipxv specifies the v coordinate of texels $t_1$ and $t_2$. Texels $t_3$ and $t_4$ have v coordinates which are one increment greater than the v coordinate of texels $t_1$ and $t_2$. Of course, texture mapper 110 must generally determine texels $t_1$, $t_2$, $t_3$, and $t_4$, and therefore must generally determine the whole, integer portions of records ipxu and ipxv, prior to calculation of weighted average color 910 (FIG. 9A) and the weighted average color corresponding to texels $t_3$ and $t_4$.

Texture mapper 110 (FIG. 4) retrieves from weight table 402 the item of weight table 402 corresponding to the fractional portion of record ipxv. Texture mapper 110 weights weighted average color 910 (FIG. 9A), which is a weighted average of the colors of texels $t_1$ and $t_2$ using the upper sixteen-bit fixed number of the partitioned weight using the MUL8X16AU operation in the manner described above with respect to FIG. 6. Similarly, texture mapper 110 (FIG. 4) weights the second weighted average color, which is a weighted average of the colors of texels $t_3$ and $t_4$ using the lower sixteen-bit fixed number of the partitioned weight using the MUL8X16AL operation in the manner described above with respect to FIG. 7. The results of the MUL8X16AU and MUL8X16AL operations are summed by texture mapper 110 using the FPADD16 operation in the manner described above with respect to FIG. 8. The resulting partitioned sum is packed into four partitioned eight-bit unsigned integers using the FPACK16 operation as described above with respect to FIGS. 9A and 9B to produce an interpolated texel color.

Texture mapper 110 generates from the interpolated texel color and the color of pixel $p_1$ a display pixel having a corresponding display color. As described briefly above, the interpolated texel color and the color of pixel $p_1$ by, for example, replace, modulation, blending, or decal techniques. In a preferred embodiment, texture mapper 110 combines the interpolated texel color and the color of pixel using the partitioned arithmetic operations described above to combine all four components of the colors simultaneously and in parallel within processor 102. Texture mapper 110 displays the generated display pixel color in computer display device 108 as a part of textured graphical object 116. In one embodiment, texture mapper 110 uses a Z buffer hidden surface removal mechanism and therefore stores the generated display pixel color and a corresponding z coordinate of pixel $p_1$ in a display buffer and Z buffer, respectively, if the contents of the Z buffer indicate that pixel $p_1$ is visible. Z buffer hidden surface removal mechanisms are well known and are not described further herein.

Texture mapper 110 performs the texture mapping technique described above for each pixel rendered of graphical object 112 (FIG. 1) to produce and display in computer display device 108 textured graphical object 116. Texture mapper 110 renders graphical object 112 using conventional techniques to determine the location and color of each pixel of a graphical representation of graphical object 112. However, prior to causing display of each pixel of graphical object 112, texture mapper 110 maps each pixel to texture image 114 and blends colors of the four nearest texels in the manner described above to produce textured graphical object 116 and to give textured graphical object 116 the textured appearance defined by texture image 114.

Scaling of Partitioned Weights

Performance of the FPACK16 operation described above by processor 102 in response to a computer instruction of texture mapper 110 so directing scales, clips, and packs four partitioned sixteen-bit fixed point numbers into four partitioned eight-bit unsigned integer numbers simultaneously and in parallel. As further described above, performance of the FPACK16 operation scales by shifting each of the partitioned sixteen-bit fixed point numbers to the left by a number of bits specified in scale factor 902S (FIG. 9A) of GSR 902 which is stored in floating point register file 38 (FIG. 2). As described above, the FPACK16 operation is used both to scale and pack weighted average colors as described above with respect to FIGS. 9A and 9B and to generate a display pixel color from the interpolated texel color and the pixel color. As described more completely above, scale factor 902S (FIG. 9A) of GSR 902 specifies the location within a 16-bit word of an implicit decimal point which separates a whole, integer portion of the sixteen-bit word from a fractional portion of the sixteen-bit word.

In one embodiment, scale factor 902S is selected to specify that such a sixteen-bit word includes ten (10) most significant bits which specify a whole, integer portion and six (6) least significant bits which specify a fractional portion. In this embodiment, the most significant bit is an overflow bit, the next significant bit is a sign bit and the next eight bits specify, in conjunction with the sign bit, the integer portion of a number between −256.0 and 256.0. As a result, such a sixteen-bit word can represent all possible values of a color and yet maximizes precision in representing fractional components of a color.

The partitioned coefficients of the items of weight table 402 are stored within texture mapper 110 in the same format of operands used in combining interpolated texel colors with pixel colors. As a result, data which specifies that the implicit decimal point in a sixteen-bit word separates a ten-bit whole, integer portion and a six-bit fraction portion is loaded into GSR 902 only once during the rendering of numerous pixels of graphical object 112. Otherwise, the data stored in scale factor 902S would have to be changed prior to calculation of the interpolated texel color and again prior to generation of the corresponding display pixel color from the interpolated texel color and pixel $p_1$. By avoiding storage of data in scale factor 902S twice for each pixel rendered, texture mapper 110 significantly improves the efficiency with which texture graphical object 116 is rendered from graphical object 112 and texture image 114.

Tri-Linear Interpolation of Texel Color: Mipmapping

Texture mapping frequently requires that the texture image, e.g., texture image 114 (FIG. 1), is scaled down or scaled up to minify or magnify, respectively, the texture pattern of the texture image in accordance with minification or magnification, respectively, of graphical object 112. For example, if graphical object 112 is defined to be at a position which is far from a viewer, graphical object 112 is rendered as textured graphical object 116 with a relatively small size. To maintain relatively realistic texturing of textured graphical object 116, the texture pattern of texture image 114 must be minified.

Such minification is accomplished by a conventional technique called mipmapping. In mipmapping, texture image 114 (FIG. 10) includes a number of texture sub-images 114A-G, each of which includes a graphical texture pattern which corresponds to a respective degree of minification of textured graphical object 116 (FIG. 1). For example, texture sub-image 114A (FIG. 10) includes a graphical texture pattern corresponding to graphical object 112 (FIG. 1) in its original size, i.e., without minification or magnification. Texture sub-image 114B (FIG. 10) has a width which is one-half the width of texture sub-image 114A, has a height which is one-half the height of texture sub-image 114A, and includes a graphical texture pattern which corresponds to graphical image 112 (FIG. 1) when graphical image 112 is rendered to a size which is one-half the original size of graphical image 112. Each successive one of texture sub-images 114B-G (FIG. 10) is one-half the width and one-half the height of the preceding one of texture sub-images 114A-G. By specifying a graphical texture pattern for several degrees of minification, undesirable artifacts of minifying the graphical texture pattern of texture image 114 are substantially and significantly reduced.

Figure 10:
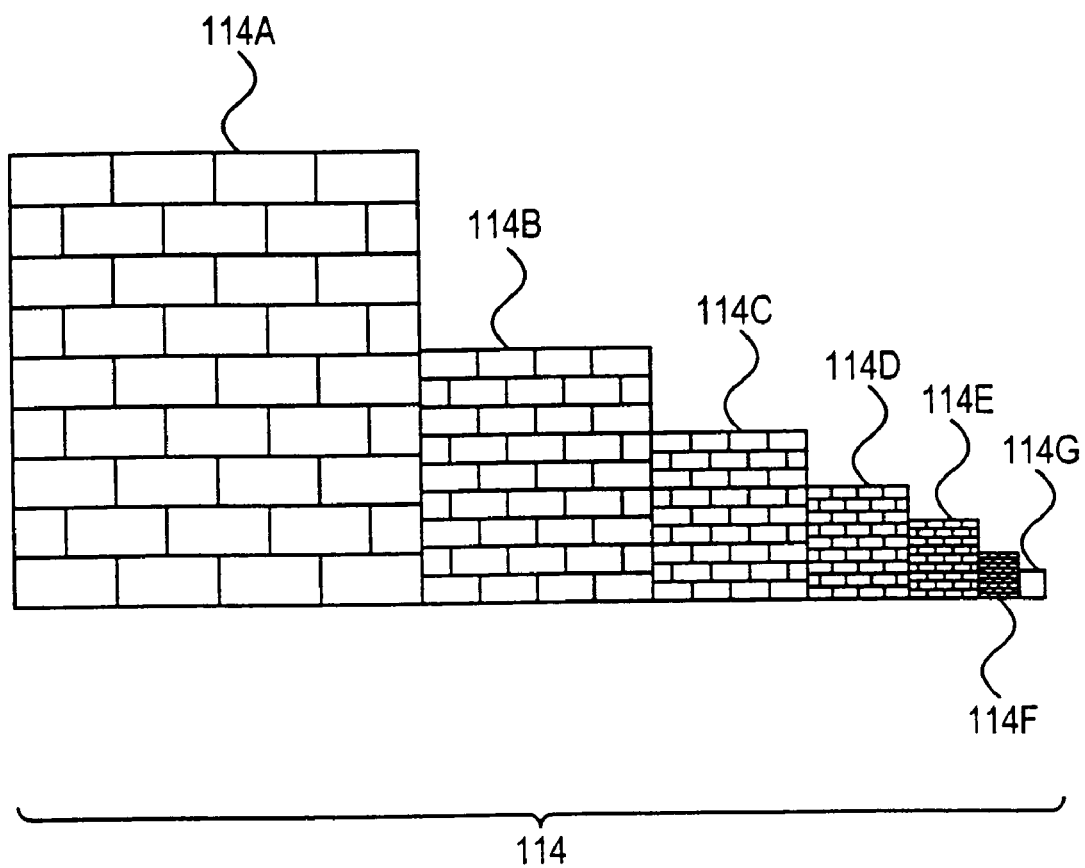
FIG. 10 is a diagrammatic view of multiple texture sub-images of a mipmap texture image.

Graphical objects such as graphical object 112 (FIG. 1) are frequently rendered at sizes with degrees of minification which are between the particular degrees of minification corresponding to texture sub-images 114A-G (FIG. 10). As a result, in rendering a pixel of graphical object 112 (FIG. 1), it is frequently desirable to interpolate, not only between the nearest texels in a particular texture sub-image, but also between the nearest two of texture sub-images 114A-G (FIG. 10).

Figure 11:
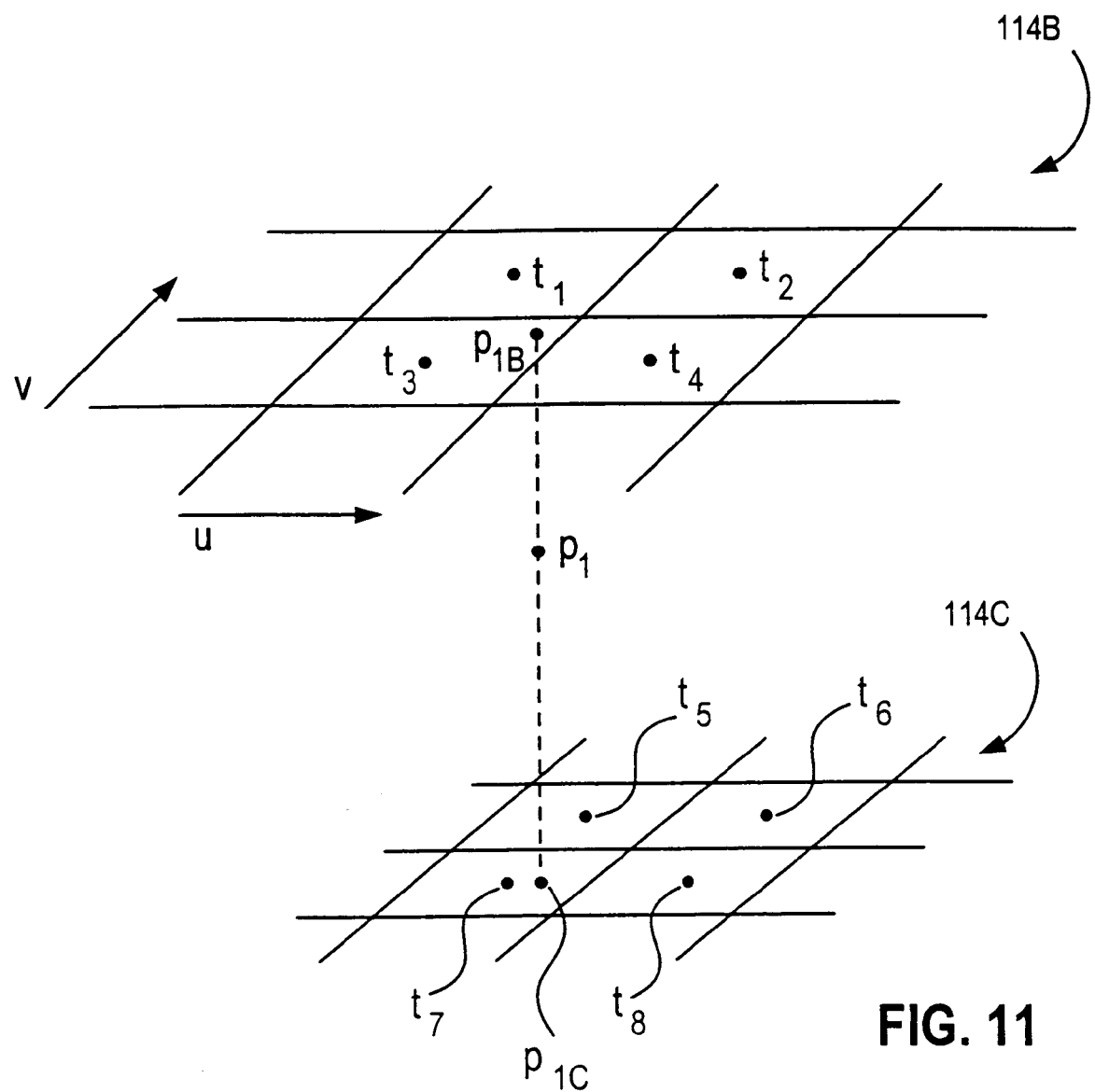
FIG. 11 illustrates the location of a pixel between levels in a mipmapping texture coordinate space.

In accordance with the present invention, texture mapper 110 (FIG. 1) uses a partitioned weight to interpolate between the two of texture sub-images 114A-G (FIG. 10) nearest the pixel. FIG. 11 shows pixel $p_1$ mapped between nearest texture sub-images 114B and 114C. When rendering graphical object 112 using a parallel view, the depth of pixel $p_1$, i.e., the degree of minification of pixel $p_1$, is less significant in the rendering of pixel $p_1$ than the u and v coordinates of pixel $p_1$ in the coordinate space of a particular one of texture sub-images 114A-G. Therefore, in one embodiment, a degree of minification is calculated once during the rendering of graphical object 112 (FIG. 1) with a parallel point of view and the calculated degree of minification is used in rendering all pixels of graphical object 112. Accordingly, partitioned coefficients of items of weight table 402 (FIG. 4) are not used when rendering graphical object 112 with a parallel point of view. However, when graphical object 112 is rendered with a perspective point of view, the degree of minification is calculated more frequently and the partitioned coefficients of weight table 402 (FIG. 4) are used to associate with adjacent texture sub-images of texture image 114 respective relative weights.

Texture mapper 110 calculates the degree of minification using well known relationships between the texture coordinates and device coordinates of computer display device 108 (FIG. 1). The calculated degree of minification is stored within texture mapper 110 as a floating point number having a whole portion and a fractional portion. The value of the whole portion specifies the first of the nearest two of texture sub-images 114A-G (FIG. 10). The other of the nearest two of texture sub-images 114A-G is the one corresponding to one increment of minification greater than that corresponding to the first of texture sub-images 114A-G. For example, the whole portion of the degree of minification of pixel $p_1$ (FIG. 11) specifies texture sub-image 114B as the first of the two nearest texture sub-images, and texture sub-image 114C corresponds to a degree of minification one increment greater than that of texture sub-image 114B and is therefore the second of the two nearest texture sub-images.

Figure 12:
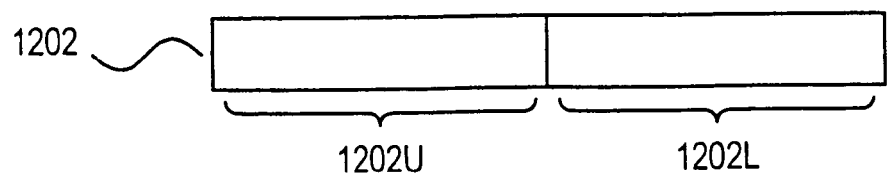
FIG. 12 is a block diagram of a weighted level record of the pixel of FIG. 11.

The fractional portion of the calculated degree of minification of pixel $p_1$ is scaled from the range 0.0-1.0 to the range 0.0-256.0 in the format of a sixteen-bit fixed point number described above. The scaled fractional portion is stored in the lower partitioned coefficient 1202L (FIG. 12) of a weighted level record 1202 within texture mapper 110 (FIG. 4). Weighted level record 1202 (FIG. 12) is a 32-bit word which includes two partitioned sixteen-bit fixed point coefficients. Texture mapper 110 (FIG. 4) calculates a complementary scaled fractional portion, which is 256.0 minus the first scaled fractional portion, and stores the complementary scaled fractional portion in the upper partitioned coefficient 1202U of weighted level record 1202. The sum of upper partitioned coefficient 1202U and lower partitioned coefficient 1202L is therefore 256.0 which is selected for the reasons given above with respect to the partitioned coefficient of items of weight table 402 (FIG. 4).

In rendering pixel $p_1$ (FIG. 11), texture mapper 110 (FIG. 4) calculates a first composite weighted average color corresponding to the colors of texels $t_1$ (FIG. 11), $t_2$, $t_3$, and $t_4$ based on the relative distances of texels $t_1$, $t_2$, $t_3$, and $t_4$ from pixel $p_{1B}$, which is pixel $p_1$ projected into the plane of texture sub-image 114B. Texture mapper 110 (FIG. 4) also calculates a second composite weighted average color corresponding to the colors of texels $t_1$ (FIG. 11), $t_6$, $t_7$, and $t_8$ based on the relative distances of texels $t_5$, $t_6$, $t_7$, and $t_8$ from pixel $p_{1C}$, which is pixel $p_1$ projected into the plane of texture sub-image 114C. Texture mapper 110 (FIG. 4) calculates the first and second composite weighted average colors in the manner described above with respect to two-dimensional texture mapping. Texture mapper 110 produces a three-dimensional composite weighted average color, which is a weighted average of the first and second composite weighted averages, using weighted level record 1202 and the MUL8X16AU, MUL8X16AL, FPADD16, and FPACK16 operations in the manner described above with respect to FIGS. 6-9B. Since upper partitioned number 1202U (FIG. 12) and lower partitioned number 1202L are scaled such that their sum is 256.0, scaling factor 902S (FIG. 9A) of GSR 902 is not changed to produce, scale, clip, and pack the three-dimensional composite weighted average color. Texture mapper 110 (FIG. 4) blends the three-dimensional composite weighted average color with the color of pixel $p_1$ (FIG. 11) in the manner described above with respect to two-dimensional texture mapping to produce a pixel of textured graphical object 116 (FIG. 1).

The above description is illustrative only and is not limiting. The present invention is limited only by the claims which follow.

What is claimed is:

1. A method for mapping a texture image, which is stored in a memory of a computer system, to a graphical object, which is stored in the memory, the method comprising:
    determining whole and fractional portions of one or more texture coordinates of a pixel of the graphical object in an address space of the texture image;
    selecting from the texture image two or more texels which correspond to a first of the texture coordinates of the pixel and each of which has a color;
    selecting a pair of complementary coefficients from a table, stored in the memory, of predetermined complementary coefficients according to the fractional portion of the first texture coordinate of the pixel; and
    calculating a weighted average of the color of a first of the texels and the color of a second of the texels according to the pair of complementary coefficients to produce an interpolated texel color.

2. The method of claim 1 wherein the step of calculating comprises:
    (a) weighting the color of the first texel with a first coefficient of the pair of complementary coefficients to produce a first weighted color;
    (b) weighting the color of the second texel with a second coefficient of the pair of complementary coefficients to produce a second weighted color; and
    (c) summing the first and second weighted colors to produce the interpolated texel color.

3. The method of claim 2 further comprising loading, in a single load operation, the pair of complementary coefficients into a processor in which steps (a) and (b) are performed.

4. The method of claim 2 wherein each color includes two or more partitioned components;
    further wherein step (a) comprises multiplying each partitioned component of the color of the first texel with the first coefficient substantially simultaneously in a first partitioned multiplication operation; and
    further wherein step (b) comprises multiplying each partitioned component of the color of the second texel with the second coefficient substantially simultaneously in a second partitioned multiplication operation.

5. The method of claim 2 wherein each color includes two or more partitioned components;
    further wherein step (c) comprises adding each partitioned component of the color of the first texel to a respective partitioned component of the color of the second texel.

6. The method of claim 1 further comprising:
    calculating a weighted average of the color of a third of the texels and the color of a fourth of the texels according to the pair of complementary coefficients; and combining the weighted average of the colors of the third and fourth texels with the weighted average of the colors of the first and second texels to produce the interpolated texel color.

7. The method of claim 6 further comprising:
loading the pair of complementary coefficients into a processor in which the step of calculating a weighted average color of the third and fourth texels and the step of calculating a weighted average color of the first and second texels; and
preserving the state of the pair of complementary coefficients in the processor such that data representing the pair of complementary coefficients within the processor remain unchanged throughout performance of the step of calculating a weighted average color of the first and second texels and the step of calculating a weighted average color of the third and fourth texels.

8. The method of claim 6 wherein the step of calculating comprises:
(a) weighting the color of the third texel with the first coefficient to produce a third weighted color;
(b) weighting the color of the fourth texel with the second coefficient to produce a fourth weighted color; and
(c) summing the third and fourth weighted colors to produce the second weighted average color.

9. The method of claim 8 further comprising loading, in a single load operation, the pair of complementary coefficients into a processor in which steps (a) and (b) are performed.

10. The method of claim 6 further comprising:
selecting a second pair of complementary coefficients from a second table of predetermined complementary coefficients according to the fractional portion of a second of the coordinates of the pixel; and
calculating a weighted average of the first and second weighted average colors according to the second pair of complementary coefficients to produce a composite weighted average color.

11. The method of claim 10 wherein the first-mentioned pair of complementary coefficients is the same as the second pair of complementary coefficients.

12. The method of claim 10 wherein the first-mentioned table of predetermined complementary coefficients and the second table of predetermined complementary coefficients are the same.

13. The method of claim 10 wherein the step of calculating comprises:
(a) weighting the first weighted average color with a first coefficient of the second pair of complementary coefficients to produce a first weighted color;
(b) weighting the second weighted average color with a second coefficient of the second pair of complementary coefficients to produce a second weighted color; and
(c) summing the first and second weighted colors to produce the composite weighted average color.

14. The method of claim 1 further comprising:
forming each pair of complementary coefficients of the table such that the sum of the complementary coefficients of each pair of complementary coefficients of the table is equal to each other sum of the complementary coefficients of each other pair of the table and is a selected number.

15. The method of claim 14 further comprising:
selecting the selected number such that each weighted average color calculated according to any of the pairs of complementary coefficients is scaled to be within a full range of possible colors.

16. A method for mapping a texture image, which is stored in a memory of a computer system and which includes two or more texture subimages corresponding to a particular respective degrees of minification of the texture image, to a graphical object, the method comprising:
using the computer system to perform:
determining whole and fractional portions of a degree of minification corresponding to a pixel of the graphical object;
selecting from the texture image first and second texture sub-images which correspond to the degree of minification of the pixel;
providing from each of the first and second texture sub-images a respective texel, each of which has a color and each of which corresponds to the pixel;
selecting a pair of complementary coefficients from a table of predetermined complementary coefficients according to the fractional portion of the degree of minification of the pixel; and
calculating a weighted average of the color of the texel provided from the first texture sub-image and the color of the texel provided from the second texture sub-image according to the pair of complementary coefficients to produce an interpolated texel color.

17. A system for mapping a texture image, which is stored in a memory, to a graphical object, which is stored in the memory, comprising:
at least one processor; and
a storage media having stored thereon program instructions executable by the at least one processor to perform:
determining whole and fractional portions of one or more texture coordinates of a pixel of the graphical object in an address space of the texture image;
selecting from the texture image two or more texels which correspond to a first of the texture coordinates of the pixel and each of which has a color;
selecting a pair of complementary coefficients from a table, stored in the memory, of predetermined complementary coefficients according to the fractional portion of the first texture coordinate of the pixel; and
calculating a weighted average of the color of a first of the texels and the color of a second of the texels according to the pair of complementary coefficients to produce an interpolated texel color.

18. The system of claim 17 wherein calculating the weighted average comprises:
(a) weighting the color of the first texel with a first coefficient of the pair of complementary coefficients to produce a first weighted color;
(b) weighting the color of the second texel with a second coefficient of the pair of complementary coefficients to produce a second weighted color; and
(c) summing the first and second weighted colors to produce the interpolated texel color.

19. The system of claim 18 wherein the program instructions are further executable to perform loading, in a single load operation, the pair of complementary coefficients into a processor in which steps (a) and (b) are performed.

20. The system of claim 18 wherein each color includes two or more partitioned components;
further wherein (a) comprises multiplying each partitioned component of the color of the first texel with the first coefficient substantially simultaneously in a first partitioned multiplication operation; and
further wherein (b) comprises multiplying each partitioned component of the color of the second texel with the second coefficient substantially simultaneously in a second partitioned multiplication operation.

21. The system of claim 18 wherein each color includes two or more partitioned components;
further wherein (c) comprises adding each partitioned component of the color of the first texel to a respective partitioned component of the color of the second texel.

22. The system of claim 17 wherein the program instructions are further executable to perform:
calculating a weighted average of the color of a third of the texels and the color of a fourth of the texels according to the pair of complementary coefficients; and
combining the weighted average of the colors of the third and fourth texels with the weighted average of the colors of the first and second texels to produce the interpolated texel color.

23. The system of claim 22 wherein the program instructions are further executable to perform:
loading the pair of complementary coefficients into a processor in which the step of calculating a weighted average color of the third and fourth texels and the step of calculating a weighted average color of the first and second texels; and
preserving the state of the pair of complementary coefficients in the processor such that data representing the pair of complementary coefficients within the processor remain unchanged throughout performance of the step of calculating a weighted average color of the first and second texels and the step of calculating a weighted average color of the third and fourth texels.

24. The system of claim 22 wherein calculating the weighted average comprises:
(a) weighting the color of the third texel with the first coefficient to produce a third weighted color;
(b) weighting the color of the fourth texel with the second coefficient to produce a fourth weighted color; and
(c) summing the third and fourth weighted colors to produce the second weighted average color.

25. The system of claim 24 wherein the program instructions are further executable to perform loading, in a single load operation, the pair of complementary coefficients into a processor in which steps (a) and (b) are performed.

26. The system of claim 22 wherein the program instructions are further executable to perform:
selecting a second pair of complementary coefficients from a second table of predetermined complementary coefficients according to the fractional portion of a second of the coordinates of the pixel; and
calculating a weighted average of the first and second weighted average colors according to the second pair of complementary coefficients to produce a composite weighted average color.

27. The system of claim 26 wherein the first-mentioned pair of complementary coefficients is the same as the second pair of complementary coefficients.

28. The system of claim 26 wherein the first-mentioned table of predetermined complementary coefficients and the second table of predetermined complementary coefficients are the same.

29. The system of claim 26 wherein calculating the weighted average comprises:
(a) weighting the first weighted average color with a first coefficient of the second pair of complementary coefficients to produce a first weighted color;
(b) weighting the second weighted average color with a second coefficient of the second pair of complementary coefficients to produce a second weighted color; and
(c) summing the first and second weighted colors to produce the composite weighted average color.

30. The system of claim 17 wherein the program instructions are further executable to perform:
forming each pair of complementary coefficients of the table such that the sum of the complementary coefficients of each pair of complementary coefficients of the table is equal to each other sum of the complementary coefficients of each other pair of the table and is a selected number.

31. The system of claim 30 wherein the program instructions are further executable to perform:
selecting the selected number such that each weighted average color calculated according to any of the pairs of complementary coefficients is scaled to be within a full range of possible colors.

32. A storage media having stored thereon program instructions executable by a computing device to perform a method for mapping a texture image, which is stored in a memory, to a graphical object, which is stored in the memory, the method comprising:
determining whole and fractional portions of one or more texture coordinates of a pixel of the graphical object in an address space of the texture image;
selecting from the texture image two or more texels which correspond to a first of the texture coordinates of the pixel and each of which has a color;
selecting a pair of complementary coefficients from a table, stored in the memory, of predetermined complementary coefficients according to the fractional portion of the first texture coordinate of the pixel; and
calculating a weighted average of the color of a first of the texels and the color of a second of the texels according to the pair of complementary coefficients to produce an interpolated texel color.

33. The storage media of claim 32 wherein calculating the weighted average comprises:
(a) weighting the color of the first texel with a first coefficient of the pair of complementary coefficients to produce a first weighted color;
(b) weighting the color of the second texel with a second coefficient of the pair of complementary coefficients to produce a second weighted color; and
(c) summing the first and second weighted colors to produce the interpolated texel color.

34. The storage media of claim 33 wherein the method further comprises loading, in a single load operation, the pair of complementary coefficients into a processor in which steps (a) and (b) are performed.

35. The storage media of claim 33 wherein each color includes two or more partitioned components;
further wherein step (a) comprises multiplying each partitioned component of the color of the first texel with the first coefficient substantially simultaneously in a first partitioned multiplication operation; and
further wherein step (b) comprises multiplying each partitioned component of the color of the second texel with the second coefficient substantially simultaneously in a second partitioned multiplication operation.

36. The storage media of claim 33 wherein each color includes two or more partitioned components;
further wherein step (c) comprises adding each partitioned component of the color of the first texel to a respective partitioned component of the color of the second texel.

37. The storage media of claim 32 wherein the method further comprises:

calculating a weighted average of the color of a third of the texels and the color of a fourth of the texels according to the pair of complementary coefficients; and combining the weighted average of the colors of the third and fourth texels with the weighted average of the colors of the first and second texels to produce the interpolated texel color.

38. The storage media of claim 37 wherein the method further comprises:

loading the pair of complementary coefficients into a processor in which the step of calculating a weighted average color of the third and fourth texels and the step of calculating a weighted average color of the first and second texels; and preserving the state of the pair of complementary coefficients in the processor such that data representing the pair of complementary coefficients within the processor remain unchanged throughout performance of the step of calculating a weighted average color of the first and second texels and the step of calculating a weighted average color of the third and fourth texels.

39. The storage media of claim 37 wherein calculating the weighted average comprises:

(a) weighting the color of the third texel with the first coefficient to produce a third weighted color;

(b) weighting the color of the fourth texel with the second coefficient to produce a fourth weighted color; and (c) summing the third and fourth weighted colors to produce the second weighted average color.

40. The storage media of claim 39 wherein the method further comprises loading, in a single load operation, the pair of complementary coefficients into a processor in which steps (a) and (b) are performed.

41. The storage media of claim 37 wherein the method further comprises:

selecting a second pair of complementary coefficients from a second table of predetermined complementary coefficients according to the fractional portion of a second of the coordinates of the pixel; and calculating a weighted average of the first and second weighted average colors according to the second pair of complementary coefficients to produce a composite weighted average color.

42. The storage media of claim 41 wherein the first-mentioned pair of complementary coefficients is the same as the second pair of complementary coefficients.

43. The storage media of claim 41 wherein the first-mentioned table of predetermined complementary coefficients and the second table of predetermined complementary coefficients are the same.

44. The storage media of claim 41 wherein calculating the weighted average comprises:

(a) weighting the first weighted average color with a first coefficient of the second pair of complementary coefficients to produce a first weighted color;

(b) weighting the second weighted average color with a second coefficient of the second pair of complementary coefficients to produce a second weighted color; and (c) summing the first and second weighted colors to produce the composite weighted average color.

45. The storage media of claim 32 wherein the method further comprises:

forming each pair of complementary coefficients of the table such that the sum of the complementary coefficients of each pair of complementary coefficients of the table is equal to each other sum of the complementary coefficients of each other pair of the table and is a selected number.

46. The storage media of claim 45 wherein the method further comprises:

selecting the selected number such that each weighted average color calculated according to any of the pairs of complementary coefficients is scaled to be within a full range of possible colors.

* * * * *